Dec. 30, 1958 W. J. LEE 2,866,492

TUBELESS TIRE VALVE

Filed Aug. 20, 1954

INVENTOR.
WALTER J. LEE

BY
R. L. Miller
ATTORNEY

United States Patent Office 2,866,492
Patented Dec. 30, 1958

2,866,492

TUBELESS TIRE VALVE

Walter J. Lee, Akron, Ohio, assignor to The Goodyear Tire & Rubber Company, Akron, Ohio, a corporation of Ohio Application August 20, 1954, Serial No. 451,262

4 Claims. (Cl. 152—427)

This invention relates to a rubber valve stem and particularly to a rubber valve stem for use with a tubeless tire and rim assembly.

It is an object of the present invention to provide a rubber valve stem which may be easily affixed to and removable from the outer side of a rim for use with tubeless tires.

Another object of the invention is to provide a self-sealing and self-retaining rubber valve stem adapted for use with a tubeless tire and insertable into the valve rim hole from the outer side of the rim.

Another object of the invention is to provide a rubber valve stem of the type described which retains a seal against the leakage of air through the rim hole under the various forces exerted during operation. For a better understanding of the invention, reference may be made to the accompanying drawings in which.

Figure 1:
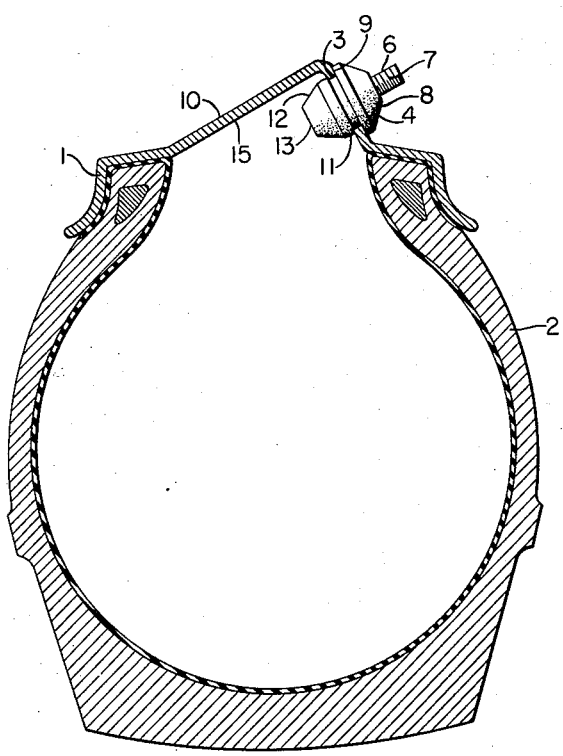
Fig. 1 is a cross-sectional view taken longitudinally through the valve stem embodying the present invention mounted upon the tire and rim assembly.

Referring to Fig. 1 of the drawing, numeral 1 indicates a tire rim upon which is mounted a tubeless tire 2. The rim 1 is provided with a valve hole 3 of standard dimensions through which the valve stem, generally indicated by the numeral 4, projects. The stem 4 is provided with an axial bore having a metal valve tube 5 disposed therein and bonded to the stem 4 for substantially the complete length of the stem. The outer end 6 of the tube 5 projects above the stem 4 and is provided with threads 7 adapted to retain a conventional valve cap (not shown). The internal surface of the tube 5 is provided with threads for securing therein a conventional valve core (not shown).

Figure 2:
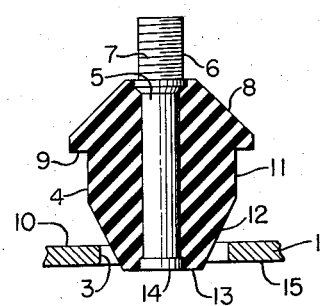
Fig. 2 is an elevational cross-sectional view of the valve stem embodying the present invention.
Figures 4, 5:
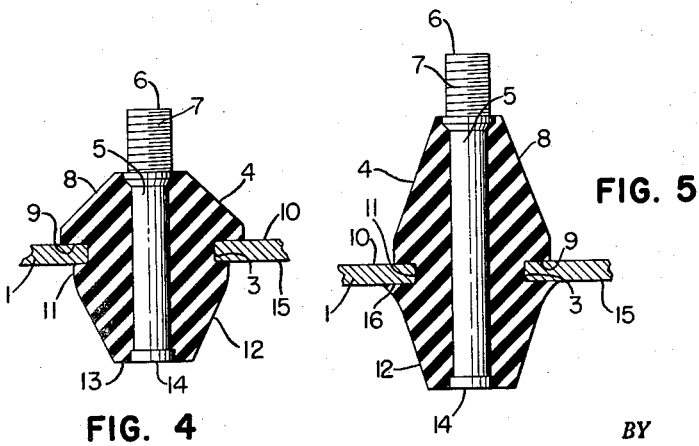
Fig. 4 is a cross-sectional view of the valve stem shown in Fig. 1 mounted on a rim.
Fig. 5 is a cross-sectional view of the valve shown in Fig. 3 mounted on a rim.

Referring to Fig. 2 of the drawing, the valve stem 4 has a head portion 8 which gradually tapers and terminates in a flange 9 constituting the maximum diameter of the stem 4. In operating position the flange 9 bears against the outer surface 10 of the rim adjacent the valve hole, as shown in Fig. 4. The neck portion 11 of the valve stem 4 bears against the inner periphery of the rim valve hole 3. The valve stem is also provided with a base portion 12 disposed inwardly of the neck 11 which gradually tapers toward the bottom 13 of the base and the inner end 14 of the tube 5 to form a frusto-conical-shaped base. The diameter of the base portion 12 at the bottom 13 thereof is substantially less than the diameter of the valve rim hole 3. The diameter increases in direct ratio to the distance from the neck portion 11 which is dispersed intermediate the outer end 6 and inner end 14 of the tube 5.

In order to provide a seal between the neck portion 11 of the stem and the periphery of the valve rim hole 3, the neck portion has an outside diameter between 18 and 50% larger than the diameter of the valve rim hole 3. As shown in cross-section in Fig. 4, the neck portion 11 of the stem is highly compressed, when in operative position, between the valve insert or tube 5 and the inner periphery of the valve rim hole 3. The flange 9 is likewise compressed against the outer rim surface 10 adjacent the valve rim hole to thereby seal the hole against the leakage of air and provide a positive stop to locate the valve during the mounting operation. The flange 9 additionally serves to hold the valve stem normal to the rim surface. The compression of the neck portion between the stem 5 and the inner periphery of the valve rim hole 3 is sufficiently high to prevent the stem from being pulled out manually, thrown out by centrifugal force or forced out by air pressure through the valve rim hole 3.

The valve stem shown in Fig. 2 is easily applied to the rim 1 from the outer side 10 thereof. The valve may be inserted into the rim 1 when the tire 2 is mounted on the rim 1 or when the inner surface 15 of the rim is otherwise inaccessible. The valve stem is attached to the rim by manually inserting the tapered base 12 into the valve hole 3 from the outer side 10 toward the inner side 15 of the rim 1 until the wider portion of the tapered base engages the periphery of the valve hole. A blow or axial force is then applied to the head 7 to force the base 11 through the hole 3 and seat the neck portion 11 and flange 9 in and around the valve rim hole.

Figure 3:
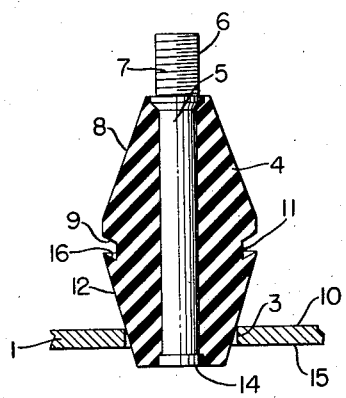
Fig. 3 is a cross-sectional view similar to Fig. 2 of another form of the invention.

Fig. 3 of the drawing discloses a modification of the present invention in which the valve stem may be inserted from either the inner side 15 or outer side 10 of the rim 1. The valve stem 4 is provided with a tube 5, a tapered head 8, a flange 9, a neck portion 11 and a tapered base 12, each corresponding in construction to Fig. 2. The head 8 and base 12 are frusto-conical in shape and are respectively gradually tapered toward the outer end 7 and inner end 14 of tube 5 a diameter substantially less than the diameter of neck 11 and the valve rim hole 3. The flange 9 is disposed at an acute angle to a radial plane and the base 12 is provided with a flange 16 extending radially in a plane parallel to the flange 9 and adjacent the neck 11 so that the neck portion 11 constitutes the bottom of a groove formed by the flanges and engages the inner periphery of the valve rim hole 3 and the flanges 16 and 9 engage the inner and outer rim surfaces, 15 and 10 respectively, adjacent the valve rim hole 3. The flanges 9 and 16 also provide a positive stop to locate the valve during the mounting operation and to hold the valve normal to the rim surfaces.

As previously indicated, the embodiment of the invention shown in Fig. 3 may be inserted into the valve rim hole from either the inner side 15 or outer side 10 of the rim 1. Assuming that the valve is to be applied from the outer side 10 of the rim, the base 12 is inserted into the valve hole 3 from the outer side 10 toward the inner side 15 of the rim 1, until the wider portion of the base 12 engages the periphery of the valve hole. A blow or axial force is then applied to the head 8 to force the base 12 completely through the hole 3 and seat the neck 11, flange 9 and flange 16 in and around the valve rim hole 3.

While certain representative embodiments and details have been shown for the purpose of illustrating the invention, it will be apparent to those skilled in the art that various changes and modifications may be made therein without departing from the spirit or scope of the invention.

I claim:
1. A valve and rim assembly for use with tubeless tires comprising in combination a rim having an aperture therein and a valve stem adapted to seal the aperture against the leakage of air, said stem being made of rubber and bonded to a metallic valve tube having a threaded outer end, said stem having a neck portion substanially equidistant from the ends of the stem which is larger in diameter than said aperture whereby said neck portion is highly compressed between the walls defining the aperture and said tube, said stem having a radially extending flange adjacent said neck portion engaging the outer surface of said rim, said flange constituting the maximum diameter of said stem, said stem having a base portion extending axially from said neck portion in a direction inwardly of the rim and tapering toward the inner end of said stem to a diameter substantially less than said aperture.

2. A valve and rim assembly as claimed in claim 1 in which said flange extends at an acute angle to a plane normal to the valve tube.

3. A valve and rim assembly as claimed in claim 2 in which an additional flange is provided engaging the inner surface of the rim, said flange extending parallel to the flange engaging the outer surface of said rim.

4. A valve for use with tubeless tires comprising a metal valve tube having a threaded outer end, a rubber stem bonded to said valve tube for the complete length of the stem, said stem having a neck portion substantially equidistant from the ends of said stem, said neck portion adapted to be compressed between said tube and the walls of a rim aperture, said stem tapering from a minimum diameter at the inner end of said tube to said neck portion, said stem having a radially extending flange located in a transverse plane between said neck portion and the outer end of said tube adapted to engage the outer surface of a rim and constituting the maximum diameter of said stem to provide a positive stop as said stem is inserted into a rim aperture.

References Cited in the file of this patent
UNITED STATES PATENTS

| | | |
|---|---|---|
| 1,915,249 | Jorgensen | June 20, 1933 |
| 2,192,572 | Bourdon | Mar. 5, 1940 |
| 2,225,472 | Franklin | Dec. 17, 1940 |
| 2,634,785 | Tubbs | Apr. 14, 1953 |
| 2,769,476 | Herzegh | Nov. 6, 1956 |